United States Patent
Darakananda

(10) Patent No.: US 9,314,945 B2
(45) Date of Patent: Apr. 19, 2016

(54) METHOD FOR PRODUCING ARTIFICIAL STONE USING USED GROUND COFFEE

(71) Applicant: Sonite Innovative Surfaces Co., Ltd., Bangkok (TH)

(72) Inventor: Nithiphan Darakananda, Bangkok (TH)

(73) Assignee: Sonite Innovative Surfaces Co., Ltd. (TH)

( * ) Notice: Subject to any disclaimer, the term of this patent is extended or adjusted under 35 U.S.C. 154(b) by 332 days.

(21) Appl. No.: 13/942,991

(22) Filed: Jul. 16, 2013

(65) Prior Publication Data

US 2014/0023788 A1 Jan. 23, 2014

(30) Foreign Application Priority Data

Jul. 18, 2012 (TH) .................................. 1203001339

(51) Int. Cl.
*B29C 39/00* (2006.01)
*C04B 18/24* (2006.01)
*C04B 26/06* (2006.01)
*C04B 26/16* (2006.01)
*C04B 26/18* (2006.01)
*C08K 3/26* (2006.01)

(52) U.S. Cl.
CPC ............. *B29C 39/003* (2013.01); *C04B 18/248* (2013.01); *C04B 26/06* (2013.01); *C04B 26/16* (2013.01); *C04B 26/18* (2013.01); *C04B 18/24* (2013.01); *C08K 2003/265* (2013.01); *Y02W 30/97* (2015.05)

(58) Field of Classification Search
None
See application file for complete search history.

(56) References Cited

U.S. PATENT DOCUMENTS

| | | | | |
|---|---|---|---|---|
| 6,706,081 B2 * | 3/2004 | Mack | ...................... | C11C 5/008 431/288 |
| 6,964,142 B1 * | 11/2005 | Otani | ...................... | C04B 28/14 52/741.3 |
| 2013/0139729 A1 * | 6/2013 | Ong | ...................... | C04B 16/00 106/697 |

FOREIGN PATENT DOCUMENTS

| | | | | | |
|---|---|---|---|---|---|
| KR | 1020040051186 A | * | 6/2004 | ................. | C08J 5/00 |
| KR | 1020140043588 A | * | 4/2014 | ................. | E04C 2/02 |
| WO | WO2015160011 A1 | * | 10/2015 | ................ | C04B 18/24 |

OTHER PUBLICATIONS

Machine translation KR1020140043588A, Apr. 2014.*
Machine translation KR1020040051186A, Jun. 2004.*

\* cited by examiner

*Primary Examiner* — Benjamin Schiffman
(74) *Attorney, Agent, or Firm* — Kim Winston LLP

(57) ABSTRACT

The present invention discloses the method for producing artificial stone using used ground coffee including the steps of drying the used ground coffee; mixing and stirring resin, color and metal salt initiator thoroughly; then mixing used ground coffee, calcium carbonate or aluminum trihydrate (ATH) or mixtures of both calcium carbonate and aluminum trihydrate and peroxide with mixtures of resin, color and metal salt initiator; then stirring whole mixtures and leaving the mixtures to form a gel; next filling the mold with gelated mixtures and leaving them for setting at room temperature; removing and drying artificial stone in an oven to complete the reaction and to achieve the excellent product; then coating products with waterproof agents (Water Repellant; Water Repellant Preservative) or coated with resin as lacquer.

8 Claims, No Drawings

METHOD FOR PRODUCING ARTIFICIAL STONE USING USED GROUND COFFEE

FIELD OF THE INVENTION

The present application relates to the fields of chemical engineering, chemistry, and materials science. More particularly, disclosed herein is the method for producing artificial stone using used ground coffee as its component.

BACKGROUND OF THE INVENTION

Coffee is the most popular drink of people all over the world. Currently, the number of coffee consumers is widely expanded. Moreover, the current trend of coffee lovers turning towards more preference for coffee with rich flavor and full of aroma is increasing, as well as changing their changing their lifestyle. Therefore, coffee shops has become the centers where people can get together to relax, chat and work. Due to the dramatically demanding trend of increasing consumption of fresh coffee, therefore, the waste from used ground coffee also has been increased. If this waste is left unattended, it is then in vain which can be left as waste in vain. It is also required measures to eliminate such waste. The inventor has realized the way to take advantage of the used ground coffee, which can be developed as interior decoration products including artificial stones and tiles by applying this used ground coffee as their components.

Method for producing an artificial stone typically consists of resin, inorganic materials, and/or chemicals used for fire retardant depending on requirement. Raw materials used in producing the artificial stone are divided into three main groups including inorganic materials, fire retardant and resin.

Thai Patent Number 9401002559 has disclosed an artificial stone mixture which is comprised of inorganic components containing mixed small and fine particle components as well as resin component. The fine particle components consist of transparent particle substances coated with inorganic solid layer selected from water glass, polishing agent for ceramics, acrylic resin or polyester resin.

SUMMARY OF THE INVENTION

The present invention aims to provide a method for producing an artificial stone by utilizing waste materials as a component thereof. The artificial stone of the present invention has distinctive characteristics and properties from conventional artificial stones. This invention discloses a method for producing the artificial stone using used ground coffee as its main component comprising various processes including drying the used ground coffee; mixing it with resin, color and catalysts; adding additives consisting of calcium carbonate or aluminum trihydrate and the catalysts to the used ground coffee; restirring the mixture; filling the mixture into a mold; polishing the product into a smooth shape as desired; and then coating it with waterproof agents or resin as lacquer.

With the method of producing the artificial stone using the used ground coffee as its component, the used ground coffee is distributed evenly throughout the stone, which makes the stone has a distinctive pattern of dots, has a dimensional look, and is more beautiful. Moreover, this product has its own a pleasant aroma of fresh coffee.

DETAILED DESCRIPTION OF THE INVENTION

The present invention discloses a method for producing an artificial stone having used ground coffee as a component. The method comprising the following steps of;

Drying or oven drying the used ground coffee;
Thoroughly mixing resins selected from polyester, polyurethane, vinyl and acrylic, color, and metal salt initiator with the used ground coffee and additives, then adding peroxide as a catalyst, mixing all materials for 5 minutes or combining thoroughly, and then leaving the mixtures to form a gel;
Filling a mold with the mixture and subsequently curing them at room temperature for the product setting;
Removing the product from the mold and drying them with heat to accelerate a complete setting;
Polishing the product to be smooth and varnishing as required; and
Coating the product with waterproof agents or lacquer.

Each step of the method in details will be described by the following examples.

In the drying of the used ground coffee, a length of time for drying the used ground coffee or a temperature for drying the used ground coffee may vary according to its moisture content contained in the used ground coffee. The temperature and length of time are typically from 50 to 130° C. for 0.8 to 2 hours. These used ground coffee is obtained from grinding coffee beans by a coffee grinder and these coffee beans have already been extracted for consumption. This is to say, these used ground coffee is a waste after coffee brewing for consumption, which can be obtained from shops, restaurants and hotels coffee providing services, factories or enterprises where coffee has been ground by a coffee grinder into a size of approximately 0.05 to 2 mm. However, if the used ground coffee is not equal in size, then they will be sieved in order to make an artificial stone having consistent patterns suitable for this invention without going through additional process. However, if the used ground coffee is not used immediately, it has to be kept in containers and sealed to prevent moisture, impurities and mold after oven drying.

As for the process of mixing all components, these mixtures are as follow:
40%-89% by total weight of resin;
0.5-4% of the catalyst (metal salt initiator) by weight of resin;
10-40% of the used ground coffee by total weight, preferably between 20-30% by total weight;
0.5-5% of peroxide catalyst by weight of resin.
In addition, the said mixtures is further consist of
0.01-4% of the color (e.g. color paste) by weight of resin
If the natural color is desired, the color is not needed to be added to the mixtures. However, to fulfill the customers' desire, the color becomes one of the required mixtures in order to create more variety of products. and/or
Additive selected from 0.01-40% of calcium carbonate by total weight or 0.01-50% of aluminum trihydrate (ATH) by total weight, preferably between 10-45% by total weight This mixing process can be described in two phases. Firstly, resin, the color and the metal salt initiator are thoroughly mixed and stirred for 0.5 hours or until they have been thoroughly mixed, then the used ground coffee and the additive, which can optionally be chosen from either calcium carbonate or aluminum trihydrate or both, are added to the mixture of resin, the color and the metal salt initiator. The mixtures are thoroughly re-stirred for 0.1-1 hours then the catalyst (peroxide) is added.

The order of adding the used ground coffee and additives is not restricted in any order either before or after of those; however, it is shown that adding the used ground coffee first results in the mixture more viscous, therefore, it is difficult to be thoroughly mixed. As for the additives, the amount of these agents can be varied depending on the production design of the artificial stone. For example, adding more aluminum trihydrate or calcium carbonate can reduce the amount of resin and used ground coffee. In addition, the amount of the additive agents can affect the hardness and flammability of the artificial stone. Thus, the quantity of the additive agents such as aluminum trihydrate or calcium carbonate can be adjusted to obtain the artificial stone quality as desired. However, increasing more aluminum trihydrate or calcium carbonate will consequently decrease adding other mixture such as content of the used ground coffee.

Furthermore, the amount of the metal salt initiator and peroxide can be varied or selected depending on determining of a setting time of the artificial stone mixtures to become gelatinous called 'gel time'. Thus, increasing the metal salt initiator and peroxide will shorten the gel time in which the mixtures will become gelatinous more rapidly. In addition, the amount of the metal salt initiator and peroxide can be adjusted according to the moisture content of the mixture, for instance, the more remaining of moisture content in the used ground coffee, the more extending of time for the mixtures to become gelatinous or set. Therefore, adding greater of the metal salt initiator and peroxide will control the setting process.

When the whole mixtures are thoroughly mixed and left to become gel, then the mixtures will be filled in prepared molds having shapes or forms as desired by curing them approximately 1-2.5 hours until the gel has been set. Setting time at a room temperature will be different depending on the selected formulation of the additive reagents, metal salt initiator and peroxide which will effect the setting time of the gel.

Then, samples will be removed from the mold and subsequently dried in an oven at temperature of 50-120° C. for 0.5-4 hours, preferably at temperature of 80-100° C. for 1-3 hours to complete the reaction and to make the artificial stone entirely setting.

At the end of the drying stage, the dried samples will be polished to have thickness and shininess as required, then coated with waterproof agents (Water Repellant; Water Repellant Preservative) or coated with resin as lacquer such as acrylic, lacquer, polyester, polyurethane or nitrogen cellulose to enhance efficiency and durability of the artificial stone made from the used ground coffee. Resin selected as lacquer can protect the products from scratch and water penetration, even though coating with lacquer will diminish the coffee aroma.

In producing the artificial stone according to this invention, the mixtures formulation as previously mentioned can be modified. As an example of a method for producing the artificial stone according to this invention, the mixtures of this artificial stone comprising:

| | |
|---|---|
| Used ground coffee | 25% by total weight; |
| Resin | 60% by total weight; |
| Aluminum Trihydrate or Calcium carbonate | 10% by total weight; |
| Color (Color Paste) | 2% by weight of resin; |
| Catalyst (Metal Salt Initiator) | 3% by weight of resin; |
| Peroxide | 3% by weight of resin. |

Another example of the mixture formulation is:

| | |
|---|---|
| Used ground coffee | 25% by total weight; |
| Resin | 60% by total weight; |
| Aluminum Trihydrate | 7% by total weight; |
| Calcium carbonate | 3% by total weight; |

-continued

| | |
|---|---|
| Color Paste | 2% by weight of resin; |
| Catalyst (Metal Salt Initiator) | 3% by weight of resin; |
| Peroxide | 3% by weight of resin. |

As it can be seen from the previous examples, the additive agents including aluminum trihydrate and calcium carbonate can be used interchangeably as needed. For example, one formulation may contain either aluminum trihydrate or calcium carbonate, another may contain both aluminum trihydrate and calcium carbonate.

The Best Method of the Invention

As referred in the detailed description of the invention.

The invention claimed is:

1. A method for producing an artificial stone using used ground coffee, characterized in that the method comprising the steps of:
    Drying the used ground coffee at 50-130° C. for 0.8-2 hours;
    Mixing and stirring resin, color and metal salt initiator for 0.5 hours;
    Mixing the used ground coffee, additives selected from either calcium carbonate or aluminum trihydrate (ATH) or a mixtures of both calcium carbonate and aluminum trihydrate and peroxide into a mixture of resin, the color and the metal salt initiator, then stirring whole mixtures for 0.1-1 hour and then leaving the mixtures to form a gel;
    Filling a mold with the gelatinous mixture and leaving it to set at a room temperature for 1-2.5 hours;
    Removing and drying the artificial stone in an oven at temperature of 50-120° C. for 0.5-4 hours.

2. The method for producing the artificial stone using the used ground coffee according to claim 1, further comprising the step of
    Coating the product with waterproof agents (Water Repellant; Water Repellant Preservative) or coating with resin which is lacquer.

3. The method for producing the artificial stone using the used ground coffee according to claim 1, wherein said artificial stone comprising the mixtures of:
    10-40% of used ground coffee by total weight,
    0.5-4% catalyst (metal salt initiator) by weight of resin,
    40-89% of resin by total weight, and
    0.5-5% of peroxide catalyst by weight of resin.

4. The method for producing the artificial stone using the used ground coffee according to claim 3, further comprising of
    additives chosen from 0.01-40% of calcium carbonate by total weight or 0.01-50% of aluminum trihydrate by total weight, and/or
    0.01-4% of color (color paste) by weight of resin.

5. The method for producing the artificial stone using the used ground coffee according to claim 3, wherein the amount of the used ground coffee in said artificial stone is 20-30% by total weight.

6. The method for producing the artificial stone using the used ground coffee according to claim 3, wherein the amount of aluminum trihydrate in said artificial stone is 10-45% by total weight.

7. The method for producing the artificial stone using the used ground coffee according to claim 1, wherein the temperature used for drying the removed artificial stone is 80-100° C. for 1-3 hours.

8. The method for producing the artificial stone using the used ground coffee according to claim 1, wherein said resin is selected from polyester, polyurethane, vinyl and acrylic.

\* \* \* \* \*